United States Patent [19]
Witt

[11] 3,948,806
[45] Apr. 6, 1976

[54] LARGE PORE SILICA AND POLYMERIZATION CATALYST

[75] Inventor: Donald R. Witt, Bartlesville, Okla.

[73] Assignee: Phillips Petroleum Company, Bartlesville, Okla.

[22] Filed: July 26, 1973

[21] Appl. No.: 382,899

[52] U.S. Cl. .............................. 252/451; 423/338
[51] Int. Cl.² .................... B01J 21/08; B01J 29/00
[58] Field of Search ........ 252/428, 429 B, 451, 458; 423/335, 336, 338, 339

[56] References Cited
UNITED STATES PATENTS

| | | | |
|---|---|---|---|
| 2,978,298 | 4/1961 | Wetzel et al. | 252/451 X |
| 3,354,095 | 11/1967 | Burzynski et al. | 252/451 X |
| 3,798,202 | 3/1974 | Nasser, Jr. | 252/458 X |

*Primary Examiner*—Carl F. Dees

[57] ABSTRACT

Large pore silica gel is produced by reacting an alkyoxy or aryloxy silane with an alkali metal hydroxide and then contacting the reaction product with a mineral acid to form a hydrogel from which a xerogel can be produced.

4 Claims, No Drawings

LARGE PORE SILICA AND POLYMERIZATION CATALYST

This invention relates to the production of large pore silica.

In one of its more specific aspects, this invention relates to the production of silica suitable as a catalyst substrate.

The production of silicas by the reaction of alkali metal silicates and mineral acids is well known. Such processes produce silica in the form of a hydrogel from which water is separated to produce a xerogel. The resulting silicas are employed as catalyst substrates and are particularly suitable for substrates of catalysts employed in polymerization processes such as those disclosed in U.S. Pat. Nos. 2,825,721 and 3,225,023, the disclosures of which are incorporated herein by reference.

The present invention concerns an alternate method of forming large pore silicas and involves reacting a silane with an alkali metal hydroxide solution to form a reaction product. The reaction product is contacted with a mineral acid to form the hydrogel. Water is separated from the hydrogel to produce the silica in the form of a xerogel.

Suitable silanes for employment in the method of the present invention have the formula

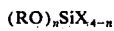

$$(RO)_n SiX_{4-n}$$

wherein R is a hydrocarbyl radical containing 1 to 12 carbon atoms selected from the group consisting of alkyls, cycloalkyls and aryls and combinations thereof, such as alkaryl, aralkyl and the like. The R groups can be alike or different and, optionally, can be halogen-substituted; $n$ is an integer having a value within the range of 1 to 4; and X is a halogen selected from the group consisting of fluorine, chlorine and bromine or an alkyl or aryl radical containing from 1 to 12 carbon atoms.

Examples of suitable silanes include tetramethoxysilane, tetraethoxysilane (ethyl orthosilicate), tetradecyloxysilane, tetracyclohexyloxysilane, tetraphenoxysilane, tetrabenzyloxysilane, phenoxytriethoxysilane, dimethoxydiethoxysilane, dimethoxydichlorosilane, phenoxytrichlorosilane, tetra(chloromethoxy)silane, tetra(2,4-dibromophenoxy)silane, di(2-fluoropropoxy)dihexyloxysilane, di(4-bromobutoxy)-dichlorosilane, tributoxychlorosilane, dimethyldiethoxysilane, methylphenyldibutoxysilane, phenyltrimethoxysilane, and the like, with alkoxysilanes, and particularly tetraethoxysilane, being preferred.

The silane is contacted, preferably, with an aqueous solution of a base such as ammonium hydroxide or an alkali metal hydroxide such as NaOH, the contact taking place at a temperature within the range of from about 33° C. to about 110° C. The resulting product is cooled and introduced into a mineral acid solution such as sulfuric acid or hydrochloric acid to form a hydrogel at a pH within the ranges of from about 5 to about 7. The concentration of the reactants is controlled to obtain a hydrogel having a silica content within the range of from about 2 to about 12 weight percent.

If the pH of the reaction mixture is less than about 5 to 7, and it can be as low as 1 to 4, sufficient ammonium hydroxide is added to raise the pH to about 5 to about 7. However, the volume of acid and volume of silane reaction mixture can be readily controlled such that no subsequent pH adjustment by base addition need to be made in forming the hydrogel.

After the silica hydrogel is formed, it is preferably aged at a temperature of about 65° F. to about 200° F. for a period of from about 1 to about 4 hours after which it is washed to reduce the soluble impurities content. The hydrogel is then converted to a xerogel by removing the water, the use of oxygen-containing, water-soluble organic compounds, such as ethyl acetate, being preferred for water removal, and other compounds which form azeotropes with water, preferably by distillation of the azeotropic mixtures.

If the silica xerogel is to be converted to a catalyst suitable for ethylene polymerization, a chromium-containing compound and chromium-containing and titanium-containing compounds can be incorporated into the hydrogel by incorporating the compounds into any of the solutions employed in the production of the hydrogel. Relatedly, either or both of the compounds can be incorporated into the hydrogel at any point in its formation or either or both of the compounds can be incorporated into the xerogel after its formation. To preserve the large pore structure of the xerogel in this situation, it is required to add water-free compounds of chromium and/or titanium, preferably organic compounds such as t-butyl chromate and titanium isopropoxide, and the like. In any instance, the xerogel containing the chromium and/or titanium compounds can be converted to a catalyst by activation in air at 800° to 1600°F., by prior art procedures, to produce a catalyst containing up to about 25 weight percent chromium as the oxide, preferably about 1 to about 5 weight percent, and up to about 15 weight percent titanium in the form of the oxide, preferably about 1 to about 10 weight percent.

The process to which the silica or resulting catalyst after chromium oxide and/or titanium oxide impregnation is particularly applicable is that generally described in British Patent No. 853,441 and is generally known as the particle-form polymerization process. In that process, at least one olefin is polymerized at a temperature within the range of from about 150° to about 230° F. by a catalyst consisting essentially of a silica support in combination with chromium-oxide, at least a portion of the chromium being in the hexavalent state at the initial contact between the olefin and the catalyst. The catalyst is maintained in suspension and is contacted with the olefin in an organic compound at pressures sufficient to maintain the organic compound in the liquid phase. The organic compound and temperatures are such that the polymer produced is insoluble in the organic compound and is recovered therefrom in the form of solid particles.

In the present invention, ethylene was polymerized in isobutane diluent at 230° F. and 550 psig, the silica support having been prepared according to the method of this invention, and thereafter impregnated with t-butyl chromate. The resulting composite was activated prior to polymerization at 1600° F. in the conventional manner to convert the chromium as previously discussed.

The method of this invention is illustrated by the following example in which the silane employed was tetraethoxysilane.

Tetraethoxysilane (176 ml, 164.7 g) was mixed with a solution of 16.7 g sodium hydroxide dissolved in 100 g of distilled water. The mixture was heated for several hours at a temperature near its boiling point until a clear solution was obtained. The solution was cooled to room temperature.

The cooled solution was introduced into 180 g of sulfuric acid solution containing 11.7 weight percent $H_2SO_4$. The introduction was made with agitation and a mixture was produced which had a pH of 2.1; then sufficient ammonium hydroxide was added until a gel formed at a pH of about 6. The hydrogel which formed contained about 9 weight percent silica.

The hydrogel was aged at a temperature of 80°–85°C. for about 4 hours. The hydrogel was then filtered and washed with 0.5 weight percent ammonium nitrate to reduce the sodium content to about 0.1 weight percent.

The hydrogel was contacted with ethyl acetate and the resulting mixture was azeotropically distilled to produce a xerogel.

The xerogel was impregnated with a pentane solution containing t-butyl chromate to deposit the equivalent of 2 weight percent $CrO_3$ on the xerogel. The resulting composite was activated in air at 1600°F. for 5 hours to produce a catalyst active for ethylene polymerization.

The catalyst was employed in ethylene polymerization as described and there was produced a polymer having a melt index of 4 at a polymer yield of 5020 grams per gram of catalyst. This compared favorably with a polyethylene polymer, produced employing a catalyst comprising a prior-art prepared silica under the same general polymerization conditions, which had a melt index of 3.8.

In the method exemplified above, the ammonium hydroxide added to adjust the pH of the solution in which the hydrogel was formed could have been present in the silane-sodium hydroxide mixture at the time of introduction into the mineral acid.

It will be evident from the foregoing that various modifications can be made to the method of this invention. Such are considered, however, to be within the scope of the invention.

What is claimed is:

1. A method of preparing a silica composition which comprises:
   a. contacting a silane with an alkali metal hydroxide to form a composite, said silane having the formula $(RO)_nSiX_{4-n}$ in which formula R is a hydrocarbyl radical containing 1 to 12 carbon atoms and selected from the group consisting of alkyls, cycloalkyls and aryls; $n$ is an integer having a value within the range of 1 to 4; and X is a halogen selected from the group consisting of fluorine, chlorine, or is an alkyl or aryl radical containing from 1 to 12 carbon atoms; and
   b. introducing said composite into contact with a mineral acid to produce a hydrogel; and,
   c. recovering the silica composition from said hydrogel.

2. The method of claim 1 in which said hydrogel is aged at a pH within the range of about 5 to about 7.

3. The method of claim 1 in which water is separated from said hydrogel by azeotropic distillation to form a silica xerogel.

4. The method of claim 1 in which said silane is tetraethoxysilane, said alkali metal hydroxide is sodium hydroxide and said mineral acid is sulfuric acid.

* * * * *